United States Patent
Li (10) Patent No.: US 11,245,944 B2
(45) Date of Patent: Feb. 8, 2022

(54) METHOD AND APPARATUS FOR RECOMMENDING LIVE STREAMING ROOM

(71) Applicant: BEIJING DAJIA INTERNET INFORMATION TECHNOLOGY CO., LTD., Beijing (CN)

(72) Inventor: Ji Li, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/137,605

(22) Filed: Dec. 30, 2020

(65) Prior Publication Data
US 2021/0314639 A1 Oct. 7, 2021

(30) Foreign Application Priority Data
Apr. 2, 2020 (CN) .......................... 202010256476.7

(51) Int. Cl.
*H04N 21/25* (2011.01)
*H04N 21/2187* (2011.01)
*H04N 21/45* (2011.01)
*H04N 21/258* (2011.01)
*H04N 21/266* (2011.01)

(52) U.S. Cl.
CPC ....... *H04N 21/251* (2013.01); *H04N 21/2187* (2013.01); *H04N 21/25891* (2013.01); *H04N 21/26603* (2013.01); *H04N 21/4532* (2013.01)

(58) Field of Classification Search
CPC ............. H04N 21/2187; H04N 21/251; H04N 21/25891; H04N 21/26603; H04N 21/4532; H04N 21/44204; H04N 21/44213; H04N 21/44222; H04N 21/45; H04N 21/466; H04N 21/4668; H04N 21/4826
USPC .......................................................... 725/46
See application file for complete search history.

(56) References Cited

U.S. PATENT DOCUMENTS

| 9,177,039 B2 | 11/2015 | Mizuguchi et al. |
| 2017/0142462 A1* | 5/2017 | Uhrich ............... H04N 21/4663 |
| 2019/0163752 A1* | 5/2019 | Barlaskar ........... G06K 9/00288 |

FOREIGN PATENT DOCUMENTS

| CN | 106488267 A | 3/2017 |
| CN | 107770571 A | 3/2018 |
| CN | 109348260 A | 2/2019 |
| CN | 109495770 A | 3/2019 |

OTHER PUBLICATIONS

Chinese Office Action dated Oct. 8, 2021 for Application No. 202010256476.7, 20 pages.

* cited by examiner

*Primary Examiner* — Nnenna N Ekpo
(74) *Attorney, Agent, or Firm* — Frost Brown Todd LLC (57) ABSTRACT

The disclosure provides a method and an apparatus for recommending a live streaming room, and a storage medium. The method is implemented as follows. Social information of a target user account is acquired in response to detecting a predetermined operation from the target user account. A target live streaming room is selected based on interaction data of each associated user account indicated by the social information. Information on the target live streaming room is displayed to the target user account.

14 Claims, 4 Drawing Sheets

METHOD AND APPARATUS FOR RECOMMENDING LIVE STREAMING ROOM

CROSS REFERENCE TO RELATED APPLICATIONS

The present application is based on and claim priority under 35 U.S.C. § 119 to Chinese Application No. 202010256476.7, filed with the China National Intellectual Property Administration on Apr. 2, 2020, the entire content of which is incorporated herein by reference.

FIELD

The disclosure relates to a technical field of live streaming, and particularly, to a method and an apparatus for recommending a live streaming room, and a storage medium.

BACKGROUND

With development of live streaming and network, more and more live streaming platforms emerge. It is difficult for a user to select an interested live streaming room accurately from multiple live streaming rooms, so the user typically accesses to a live streaming room recommended on a home page of a website at random. The recommendation of living streaming rooms is provided according to statistical data on living streaming rooms already watched by users, such that a single kind of live streaming rooms or similar live streaming is often recommended, which may cause aesthetic fatigue of the user and a limitation on the recommendation.

Therefore, it is urgent to find how to provide various kinds of live streaming rooms and enrich content of the recommended live streaming.

SUMMARY

The disclosure provides a method and an apparatus for recommending a live streaming room, a terminal, a server, a system and a storage medium. The technical solution of the disclosure will be described as follows.

Embodiments of a first aspect of the disclosure provide a method for recommending a live streaming room. The method includes: acquiring social information of a user account in response to an operation from the user account, the social information including an identification of an associated user account having a social relationship with the user account; selecting a live streaming room based on interaction data of each associated user account indicated by the social information in each live streaming room; generating recommendation information of the live streaming room based on information of the live streaming room and the identification of the associated user account; and displaying the recommendation information to the user account.

Embodiments of a second aspect of the disclosure provide a method for recommending a live streaming room. The method includes: acquiring social information of a user account in response to receiving a first request of the user account to perform an operation, so as to realize displaying of recommendation information of a live streaming room, the social information including an identification of an associated user account having a social relationship with the user account; selecting the live streaming room based on interaction data of each associated user account indicated by the social information in each live streaming room in response to receiving a second request to select the live streaming room, so as to realize displaying of the recommendation information; and generating the recommendation information for displaying based on information of the live streaming room and the identification of the associated user account in response to receiving a third request to acquire the recommendation information.

Embodiments of a third aspect of the disclosure provide an apparatus for recommending a live streaming room. The apparatus includes: a social information acquiring module, a live streaming room selecting module, and a recommendation information displaying module. The social information acquiring module is configured to acquire social information of a user account in response to an operation from the user account, the social information including an identification of an associated user account having a social relationship with the user account. The live streaming room selecting module is configured to select a live streaming room based on interaction data of each associated user account indicated by the social information in each live streaming room. The recommendation information displaying module is configured to generate recommendation information of the live streaming room based on information of the live streaming room and the identification of the associated user account and to display the recommendation information to the user account.

Embodiments of a fourth aspect of the disclosure provide an apparatus for recommending a live streaming room. The apparatus includes one or more of a social information acquiring module, a live streaming room selecting module, and a recommendation information displaying module. The social information acquiring module is configured to acquire social information of a user account in response to receiving a first request of the user account to perform an operation, so as to realize displaying of recommendation information of a live streaming room, the social information including an identification of an associated user account having a social relationship with the user account. The live streaming room selecting module is configured to select the live streaming room based on interaction data of each associated user account indicated by the social information in each live streaming room in response to receiving a second request to select the target live streaming room, so as to realize displaying of the recommendation information. The recommendation information displaying module is configured to generate the recommendation information for displaying based on information of the live streaming room and the identification of the associated user account in response to receiving a third request to acquire the recommendation information.

Embodiments of a fifth aspect of the disclosure provide a terminal. The terminal includes one or more processors and one or more memories. The one or more memories are configured to store instructions executable by the one or more processors; the one or more processors are configured to execute the instructions to implement the method for recommending a live streaming room as described above.

Embodiments of a sixth aspect of the disclosure provide a server. The server includes one or more processors and one or more memories. The one or more memories are configured to store instructions executable by the one or more processors; the one or more processors are configured to execute the instructions to implement the method for recommending a live streaming room as described above.

Embodiments of a seventh aspect of the disclosure provide a system for recommending a live streaming room. The system includes a terminal and a server as described above.

Embodiments of an eighth aspect of the disclosure provide a non-transitory computer-readable storage medium including instructions that, when executed by one or more processors of a terminal, cause the terminal to perform the method for recommending a live streaming room as described above, or when executed by one or more processors of a server, cause the server to perform the method for recommending a live streaming room as described above.

Embodiments of a ninth aspect of the disclosure provide a computer program product, when instructions in the computer program product are executed by one or more processors of a terminal or a server, causes the terminal or server to perform the method for recommending a live streaming room as described above.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the specification, illustrate embodiments consistent with the disclosure and, together with the description, serve to explain the principles of the disclosure and are not to be construed as limiting the disclosure.

DETAILED DESCRIPTION

In order to make the technical solution of the disclosure better understood, the technical solution in embodiments of the disclosure will be clearly and completely described below with reference to the accompanying drawings.

It should be noted that the terms "first", "second" and the like in the specification and claim of the disclosure and in the foregoing drawings are used for distinguishing between similar elements and not necessarily for describing a certain sequential or chronological order. It is to be understood that the data so used is interchangeable under appropriate circumstances such that embodiments of the disclosure described herein are capable of operation in other sequences than those illustrated or described herein. Implementations described in the exemplary embodiments below do not represent all implementations consistent with the disclosure. Rather, they are merely examples of the apparatus and method consistent with certain aspects of the disclosure, as detailed in the appended claims.

In order to solve a problem that tedium live streaming is recommended to a user in the related art, the disclosure provides a method and an apparatus for recommending a live streaming room, an electronic device, and a storage medium.

Figure 1:
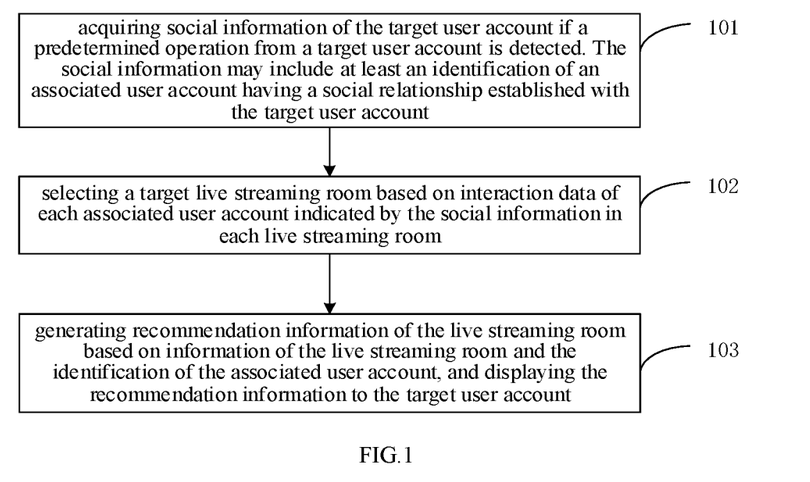
FIG. 1 is a flow chart illustrating a method for recommending a live streaming room according to an exemplary embodiment.

FIG. 1 is a flow chart illustrating a method for recommending a live streaming room according to an exemplary embodiment. As illustrated in FIG. 1, the method includes followings.

In block 101, social information of a target user account is acquired in response to an operation from the target user account. The social information at least includes an identification of an associated user account having a social relationship established with the target user account.

In block 102, a target live streaming room is selected based on interaction data of each associated user account indicated by the social information in each live streaming room.

In block 103, recommendation information of the live streaming room is generated based on information of the live streaming room and the identification of the associated user account, and the recommendation information is displayed to the target user account.

The method disclosed herein may be applicable to a terminal, a server or the like, which is not limited herein. The terminal may be a smart phone, a notebook computer, a tablet computer, or other electronic device, which is not limited herein.

With reference FIG. 1, the method for recommending a live streaming room according to the embodiment of the disclosure will be described in detail below.

In 101, if a predetermined operation from a target user account is detected, social information of the target user account is acquired. The social information may include at least an identification of an associated user account having a social relationship established with the target user account.

The predetermined operation from the target user account may refer to launching an application for watching a live streaming with the target user account, or any operation from the target user account after a live streaming home page is opened with the target user account, which is not limited herein. The terminal acquires the social information of the target user account. The social information at least includes an identification of an associated user account having a social relationship established with the target user account. The social information of the target user account may be acquired actively or passively.

In an acquisition mode, when it is detected that an application for watching the live streaming is launched with the target user account, or an operation is detected after a live streaming home page is opened with the target user account, a client on the terminal actively sends the social information of the target user account to a back-end of the terminal for storage by the back-end.

In another acquisition mode, when it is detected that an application for watching the live streaming is launched with the target user account, or an operation is detected after a live streaming home page is opened with the target user account, a back-end of the terminal actively sends an instruction for obtaining the social information of the target user account, a client may display prompt information of obtaining the social information to the target user account after receiving the instruction, and send the social information of the target user account to the back-end of the terminal for storage by the back-end after receiving an instruction for allowing (or authorizing) to upload the social information from the target user account.

The social information may include an identification of an associated user account having a social relationship established with the target user account, i.e., a friend list on a social platform of the target user account and identifications of friends in the friend list, for example a friend list from Wechat, a friend list from QQ, contacts or the like. A friend list from other platform is also possible, which is not limited herein.

In 102, a target live streaming room is selected based on interaction data of each associated user account indicated by the social information in each live streaming room.

The interaction data includes at least one of a type of each candidate live streaming room accessed by the associated user account within a predetermined time period, watching time of the associated user account in each candidate live streaming room, behavior data of the associated user account in each candidate live streaming room, and interactive information between the associated user account and a host account of each candidate live streaming room. In addition to the watching time, the interaction data may include a watching frequency or a watching period. The behavior data may include information on whether to bookmark a live streaming room, information on whether to send a bullet screen comment, or the like. The interactive information may include information on whether to follow a host account of an anchor, information on whether to send a gift to an anchor or the like. The disclosure does not limit the information.

The target live streaming room refers to a candidate live streaming room satisfying a predetermined condition. The predetermined condition may include a first condition where a recommendation index of the candidate live streaming room is ranked within a predetermined ranking range, or a second condition where a recommendation index of the candidate live streaming room is ranked within a predetermined ranking range and the candidate live streaming room is in an on-air state.

The target live streaming room may be selected based on interaction data of each associated user account indicated by the social information in each live streaming room as follows.

A recommendation index of each candidate live streaming room is determined based on the interaction data. A detailed process of determining the recommendation index of each candidate live streaming room will be described below, which is not explained here.

A candidate live streaming room satisfying a predetermined condition is selected as the target live streaming room. The predetermined condition may include a first condition where a recommendation index of the candidate live streaming room is ranked within a predetermined ranking range, or a second condition where a recommendation index of the candidate live streaming room is ranked within a predetermined ranking range and the candidate live streaming room is in an on-air state.

The predetermined condition may be set in advance, and may be modified adaptively according to actual requirements.

The predetermined condition may be set based on one of followings, the number of bullet screen comments, for example the number of bullet screen comments from all friends for each live streaming rooms may be sorted; a weighted score, for example for 0-50 bullet screen comments, a score of 10 is granted, for 50-100 bullet screen comments, a score of 20 is granted, and the live streaming rooms are sorted based on the score; the number of gifts, for example, the live streaming rooms are sorted according to the number of gifts for each live streaming room; a type of the interested live streaming room, and the number of the interested anchors or the like. The interaction data of the live streaming rooms is analyzed according to the predetermined condition to find out the live streaming rooms having better or the best content in the live streaming. For example, the live streaming room having the most bullet screen comments from the friends is determined, or the first N live streaming rooms having more bullet screen comments are determined. In the disclosure, the live streaming rooms may be scored and sorted by considering many ranking factors, for example, the number of bullet screen comments, the number of gifts, the type of the live streaming room, the weighted score, or the like, so as to determine the first N live streaming room at the top of the rankings, and the recommendation indexes corresponding to the first N live streaming rooms are set based on the rankings.

At 103, recommendation information of the live streaming room is generated based on information of the live streaming room and the identification of the associated user account, and the recommendation information is displayed to the target user account.

In some embodiments, the recommendation information can include: the number of friends, the interactive information related to the live streaming room, a duration during which a live streaming is watched or other information, which is not limited herein. For example, the recommendation information can be described as follows.

For example, the recommendation information may be "your friend sends 100 bullet screen comments for the live streaming room A, would you like to have a look?" For another example, the recommendation information may be "a live streaming of the live streaming room getting the attention and interest of your ten friends A, B . . . is on the air, would you like to have a look?" For another example, the recommendation information may be "the live streaming in the live streaming room have been watched by your friends for about 20 hours in average, would you like to have a look?" For another example, the recommendation information may be "an anchor getting the attention and interest of your twenty friends is providing a live streaming, would you like to have a look?" For another example, the recommendation information may be "your friends provide fifty gifts for a live streaming room, would you like to have a look?"

In this embodiment, the recommendation information on the target live streaming room may be displayed to the target user account in many ways.

For example, the recommendation information of the target live streaming room and a room identification of the target live streaming room may be displayed to the target user account.

For another example, the room identification of the target live streaming room along with the recommendation information may be added to a recommendation list on a recommendation page, the recommendation page is used for displaying the live streaming corresponding to the identification of each live streaming room included in the recommendation list.

In this embodiment, the recommendation information may include: the number of associated user accounts (i.e., friends), interactive information from the friend and related to the live streaming room, and a duration during which the friend watches a live streaming in the live streaming room, or other information, which is not limited herein. The recommendation information may be described as follows.

For example, the recommendation information may be "your friend sends 100 bullet screen comments for the live streaming room A, would you like to have a look?" For another example, the recommendation information may be "a live streaming of the live streaming room getting the attention and interest of your ten friends A, B . . . is on the air, would you like to have a look?" For another example, the recommendation information may be "the live streaming in the live streaming room have been watched by your friends for about 20 hours in average, would you like to have a look?" For another example, the recommendation information may be "an anchor getting the attention and interest of your twenty friends is providing a live streaming, would you like to have a look?" For another example, the recommendation information may be "your friends provide fifty gifts for a live streaming room, would you like to have a look?"

In the disclosure, when a predetermined operation from the target user account is detected, the social information (such as friendship between Wechat friends) of the target user account is acquired, and the target live streaming room is selected according to the interaction data of each associated user account indicated by the social information, and the recommendation information is generated according to the information on the target live streaming room and the identification of the associated user account from which the target live streaming room is determined and the recommendation information is displayed to the target user account. In other words, in the disclosure, by introducing the social information of the target user account as a basis of recommending the target live streaming room, the problem the tedium live streaming is recommended in the related art can be solved, thus enriching the kinds of the recommended live streaming rooms and improving a success rate of recommending the live streaming room.

Alternatively, in another embodiment, based on this embodiment, the recommendation index of each candidate live streaming room can be determined according to the interaction data of each associated user account as follows.

First Way

In 11), for each candidate live streaming room, a total amount of each kind of interaction data is acquired according to the interaction data of the associated user account in the candidate live streaming room as follows.

In 111), behavior data of each associated user account indicated by the social information is queried.

For each candidate live streaming room, the behavior data of each associated user account indicated by the social information is obtained by retrieving a behavior statistical database of the associated user account. Many retrieving methods can be adopted, which is not limited herein.

The behavior statistical database is used to record and store all behavior data of users. In addition to statistical data related to the live streaming room, the behavior statistical database further includes other behavior data of the users. In this embodiment, the behavior data mainly refers to behavior data related to the live streaming room, for example watching time in each live streaming room, the number of times of watching the live streaming in each live streaming room, a type of the interested live streaming room, data of the anchor of the live streaming room, information on whether to bookmark a live streaming room or the like. The behavior statistical database may further include the interaction data, such as the number of bullet screen comments issued in each live streaming room, the number of gifts for each live streaming room. The behavior statistical database may further include other behavior data, which is not limited herein.

In 112), the total amount of each kind of interaction data of each associated user account is queried from the behavior data of the associated user account. For example, the total amount of each kind of interaction data can be acquired as follows.

In 1121), persona analysis is performed on each associated user account in the social information to obtain user persona of each associated user account.

The terminal may find out user features of each associated user account based on behavior data of the associated user account on a live streaming platform, for example, a type of the favorite live streaming room of the associated user account, such as game, beauty, country, handwork or the like; for another example, information on whether the associated user account is interested in sending the bullet screen comments, an average time interval for sending the bullet screen comments, and a type of the anchor that is bookmarked by the associated user account or the like. The terminal may take the user features of the associated user account as the user persona. The user persona may include a user label of the associated user account, historical behavior data related to the live streaming room or the like. That is, the user persona is formed by a plurality of labels.

In 1122), the retrieved behavior data of each associated user account is screened according to the user persona of the associated user account to find out the total amount of the interaction data related to the live streaming room that satisfies the user persona.

The terminal may screen or filter the retrieved interaction data related to the live streaming room of each associated user account (i.e., friend) according to the user persona, to find out the interaction data related to the live streaming room that satisfies the user persona. The total amount of the found interaction data is determined. For example, if the user persona indicates that the associated user account sends more than twenty bullet screen comments in each live streaming room in average, it indicates that the user of the associated user account likes to send the bullet screen comment, then the behavior data on the bullet screen comments related to the live streaming watched by the friend can be queried from the statistical database of the friend. In the disclosure, many methods can be adopted to query the total amount of the interaction data related to the live streaming room, which are not limited herein.

In 12), weighted summation is performed on the total amount of each kind of interaction data according to predetermined weighting factors, to obtain the recommendation index of the candidate live streaming room.

The predetermined weighting factors can be set to different values according to different sceneries, which are not limited herein. If there is only one kind of interaction data, the total amount of the interaction data is takes as the recommendation index, for example, the top 5 live streaming rooms have the recommendation indexes five stars, four stars, three stars, two stars and one star, respectively. The recommendation indexes of other live streaming rooms may be determined similarly.

Second Way

In 21), an interested type of interaction data of the target user account is determined according to interactive behavior features of the target user account.

Interactive behavior data performed by the target user account in each live streaming room within a predetermined time period is acquired. The interactive behavior data includes at least one of a type of the live streaming room, watching time in the live streaming room, behavior data in the live streaming room and interactive information between the target user account with the host account of the live streaming room. Interactive behavior features of the target user account are acquired based on the interactive behavior data. The interactive behavior features include at least one of a type of the preferred live streaming room, preferred watching time in the live streaming room, preferred behavior data in the live streaming room, and preferred interactive information between the target user account with the host account of the live streaming room.

In 22), for each candidate live streaming room (since one live streaming room may have interaction data from one or more associated user accounts, the interaction data is counted for each candidate live streaming room in the disclosure), a total amount of the interaction data matching the interested type is acquired based on the interaction data of the associated user account corresponding to the candidate live streaming room.

In 23), weighted summation is performed on the total amount of each kind of interaction data matching the attention type according to predetermined weighting factors, to obtain the recommendation index of the candidate live streaming room.

In this embodiment, by introducing the social information of the target user account and taking the interaction data of the associated user account in the social information as the basis of recommending the target live streaming room, it is convenient for the target user account to know the live streaming room containing the live streaming watched by the friend or the most favorite anchor of the friend, such that the user of the target user account may have a desire to access to the corresponding live streaming room, thereby improving a success rate of accessing to the recommended live streaming room, and enhancing an activeness of products on the live streaming platform.

Alternatively, in another embodiment, based on the embodiment described with reference to FIG. 1, the method may further include the followings.

The terminal may send a request of the target user account to perform the predetermined operation to a server, so as to trigger the server to acquire and return the social information of the target user account.

Alternatively, the terminal may send a request to select the target live streaming room to the server, so as to trigger the server to select and return the target live streaming room based on the interaction data of each associated user account indicated by the social information.

Alternatively, the terminal may send a request to acquire the recommendation information of the target live streaming room to the server, so as to trigger the server to generate the recommendation information based on information of the live streaming room and the identification of the associated user account and return the recommendation information.

In this embodiment, the server may return the social information of the target user account, the selected target live streaming room and the generated recommendation information to the terminal where the target user account is logged.

By means of the technical solution provided by the embodiment, the terminal may acquire the social information of the target user account when the predetermined operation from the target user account is detected, select the target live streaming room based on the interaction data of each associated user account indicated in the social information and generate the recommendation information of the target live streaming room based on the information on the target live streaming room and the identification of the associated user account. The terminal not only can acquire the social information, select the target live streaming room and generate the recommendation information by itself, but also can trigger the server to acquire the social information, select the target live streaming room and generate the recommendation information. By triggering the server to acquire the social information, select the target live streaming room and generate the recommendation information, the calculation amount at the terminal can be reduced, that is, the terminal may merely display the recommendation information to the target user account in response to the predetermined operation from the target user account.

Figure 2:
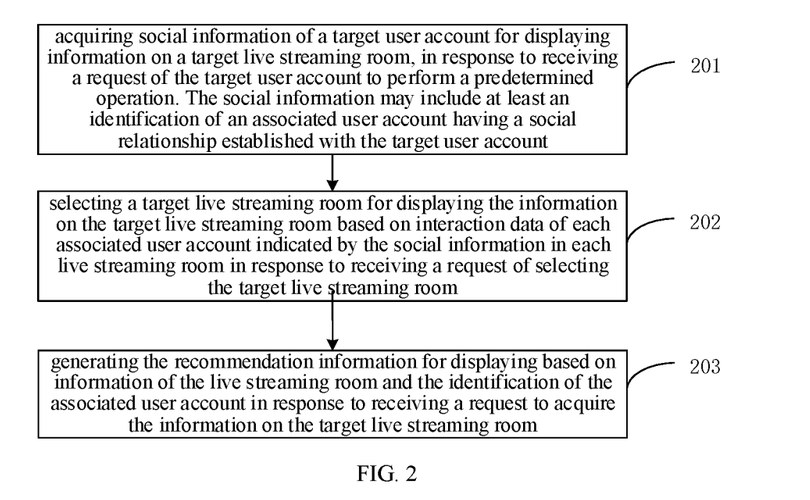
FIG. 2 is a flow chart illustrating a method for recommending a live streaming room according to another exemplary embodiment.

With reference to FIG. 2, a method for recommending a live streaming room is provided. The method is applicable to a server. The method may include at least one of the followings.

At block 201, social information of a target user account is acquired in response to receiving a request of the target user account to perform a predetermined operation, so as to realize displaying of recommendation information of a live streaming room. The social information may include at least an identification of an associated user account having a social relationship established with the target user account.

At block 202, a target live streaming room is selected based on interaction data of each associated user account indicated by the social information in each live streaming room in response to receiving a request of selecting the target live streaming room, so as to realize displaying of recommendation information of a live streaming room.

At block 203, the recommendation information is generated for displaying based on information of the live streaming room and the identification of the associated user account in response to receiving a request to acquire the information on the target live streaming room.

Regarding details about this embodiment, reference can be made on the above description, which is not explained here.

In this embodiment, the server may acquire the social information of the target user account in response to receiving the request of the target user account to perform the predetermined operation, select the target live streaming room based on the interaction data of each associated user account indicated in the social information, generate the corresponding recommendation information and return the recommendation information to the terminal for displaying. In other words, in this embodiment, the server may determine the recommendation information and send the recommendation information to the terminal for displaying by acquiring the interaction data of each associated user account in the social information of the target user account as the basis for recommending the live streaming room in response to the request of the terminal to perform the predetermined operation, such that it is convenient for the target user account to know the live streaming room accessed by the friend or the favorite anchor of the friend based on the recommendation information, and the user of the target user account may rise a desire to access to the corresponding live streaming room. In this way, a success rate of accessing to the recommended live streaming room may be improved, and an activeness of products on the live streaming platform may be enhanced.

Alternatively, in another embodiment, based on the above embodiment, the interaction data includes at least one of a type of each candidate live streaming room accessed by the associated user account within a predetermined time period, watching time of the associated user account in the candidate live streaming room, behavior data of the associated user account in the candidate live streaming room, and interactive information between the associated user account and a host account of each candidate live streaming room.

Selecting the target live streaming room based on the interaction data of each associated user account indicated by the social information in response to receiving the request to select the target live streaming room may include: in response to receiving the request to select the target live streaming room, determining a recommendation index of each candidate live streaming room based on the interaction data of each associated user account in each candidate live streaming room; and selecting the candidate live streaming room satisfying a predetermined condition as the target live streaming room. The predetermined condition may include a first condition where a recommendation index of the candidate live streaming room is ranked within a predetermined ranking range, or the predetermined condition may include a second condition where a recommendation index of the candidate live streaming room is ranked within a predetermined ranking range and the candidate live streaming room is in an on-air state.

Alternatively, in another embodiment, based on the above embodiment, determining the recommendation index of each candidate live streaming room based on the interaction data of each associated user account in response to receiving the request to select the target live streaming room may include: in response to receiving the request to select the target live streaming room, acquiring a total amount of each kind of interaction data based on the interaction data of the associated user account in a candidate live streaming room, performing weighted summation on the total amount of each kind of interaction data based on predetermined weighting factors to obtain the recommendation index of the candidate live streaming room.

Alternatively, in another embodiment, based on the above embodiment, determining the recommendation index of each candidate live streaming room based on the interaction data of each associated user account in response to receiving the request to select the target live streaming room may include: in response to receiving the request to select the target live streaming room, determining an interested type of the interaction data of the target user account based on interactive behavior features of the target user account; acquiring a total amount of each kind of interaction data matching the interested type based on the interaction data of each associated user account in the candidate live streaming room; and performing weighted summation on the total amount of each kind of interaction data satisfying the interested type based on predetermined weighting factors to obtain the recommendation index of the candidate live streaming room.

Alternatively, in another embodiment, based on the above embodiment, the method may further include: in response to receiving a request to acquire interactive behavior data, acquiring the interactive behavior data of the target user account in a live streaming room within a predetermined time period; and acquiring the interactive behavior features of the target user account based on the interactive behavior data. The interactive behavior data includes at least one of a type of the live streaming room, watching time in the live streaming room, behavior data in the live streaming room and interactive information between the target user account with the host account of the live streaming room. The interactive behavior features include at least one of a type of the preferred live streaming room, preferred watching time in the live streaming room, preferred behavior data in the live streaming room, and preferred interactive information between the target user account with the host account of the live streaming room.

Alternatively, in another embodiment, based on the above embodiment, generating the recommendation information of the target live streaming room based on the information on the target live streaming room and the identification of the associated user account and displaying the recommendation information to the target user account in response to receiving the request to acquire the recommendation information may include: in response to receiving the request to acquire the recommendation information, displaying the recommendation information and a room identification of the target live streaming room to the target user account; or adding the recommendation identification of the target live streaming room that carries the recommendation information to a recommendation list on a recommendation page, the recommendation page is used for displaying the live streaming corresponding to the identification of each live streaming room included in the recommendation list.

In this embodiment, by introducing the social information (such as the friendship information) of the user as the basis for recommending the live streaming room, the problem that the recommended live streaming is tedium can be solved, and the kinds of recommended live streaming rooms are enriched, which are not based on tedium content or statistical data. When the users who are fiends to each other watch the same or similar live streaming, it is benefit for communications between the users, which not only can enhance intimacy between the friends, but also can improve a success rate of accessing to the recommended live streaming room and enhance an activeness of products on the live streaming platform.

Figure 3:
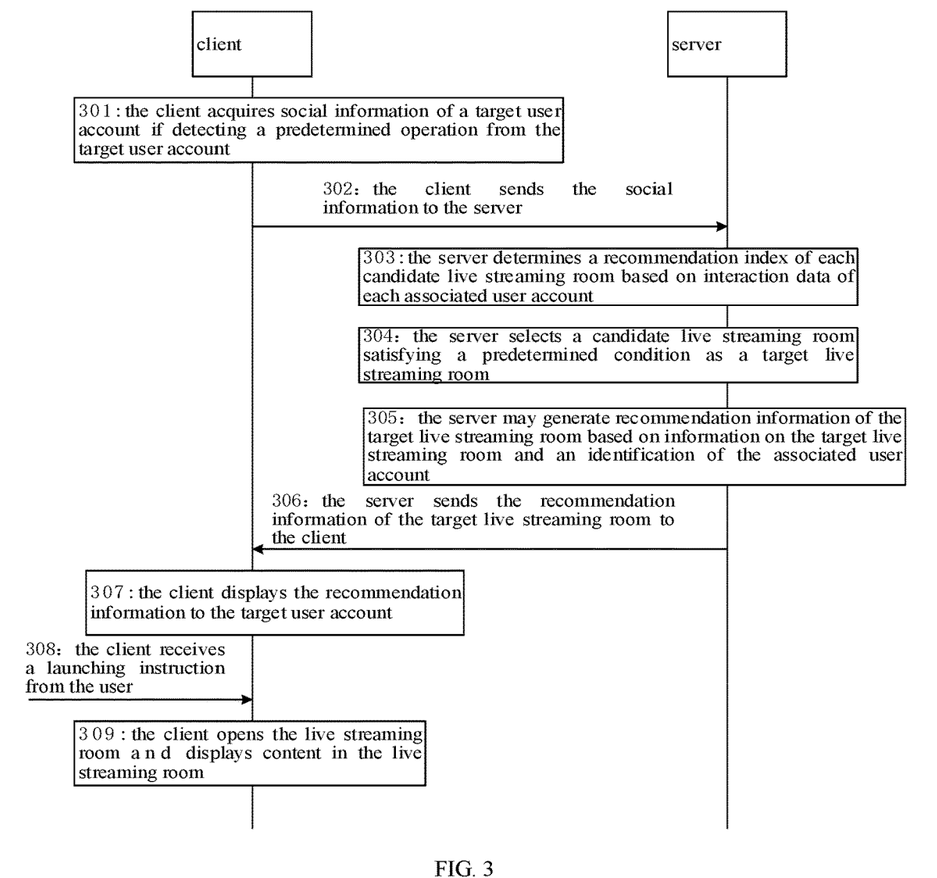
FIG. 3 is a flow chart illustrating a process for recommending a live streaming room according to an exemplary embodiment.

FIG. 3 illustrates a flow chart of a process of recommending a live streaming room according to an example embodiment. This embodiment involves entities such as a client and a server, for example. The method may include the followings.

At 301, the client acquires social information of a target user account if detecting a predetermined operation from the target user account.

The social information at least includes an identification of an associated user account having a social relationship established with the target user account. The social information may include other parameters, which is not limited herein.

At 302, the client sends the social information to the server.

At 303, the server determines a recommendation index of each candidate live streaming room based on interaction data of each associated user account.

At 304, the server selects a candidate live streaming room satisfying a predetermined condition as a target live streaming room.

The predetermined condition may include a first condition where a recommendation index of the candidate live streaming room is ranked within a predetermined ranking range, or the predetermined condition may include a second condition where a recommendation index of the candidate live streaming room is ranked within a predetermined ranking range and the candidate live streaming room is in an on-air state.

At 305, the server may generate recommendation information of the target live streaming room based on information on the target live streaming room and an identification of the associated user account.

At 306, the server sends the recommendation information of the target live streaming room to the client.

At 307, the client displays the recommendation information to the target user account.

At 308, the client receives a launching instruction from the user.

The launching instruction is used to open the live streaming room recommended in the recommendation information.

In an embodiment, the user may select to not open the live streaming room recommended in the recommendation information.

At 309, the client opens the live streaming room and displays content in the live streaming room.

Regarding details of the actions, reference may be made to the above description, which is not explained here.

In the disclosure, the client sends the acquired social information (such as a list of friends) of the user to the server, such that the server may select the target streaming room satisfying the predetermined condition based on the interaction data of each associated user account in the social information. In the disclosure, by introducing the social information of the target user account as the basis for recommending the live streaming room, the problem that tedium live streaming is recommended in the related art can be solved, such that the kinds of the recommended live streaming rooms are enriched, thus a success rate of recommending the live streaming room is improved.

Figure 4:
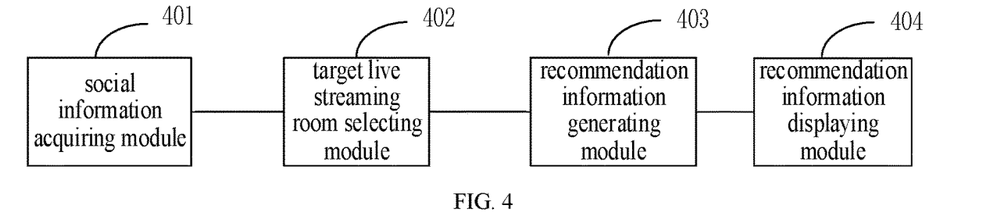
FIG. 4 is a block diagram illustrating an apparatus for recommending a live streaming room according to an exemplary embodiment.

FIG. 4 is a block diagram illustrating an apparatus of recommending a live streaming room according to an exemplary embodiment. The apparatus includes a social information acquiring module 401, a target live streaming room selecting module 402, a recommendation information generating module 403 and a recommendation information displaying module 404.

The social information acquiring module 401 is configured to acquire social information of the target user account in response to detecting a predetermined operation from a target user account. The social information may include at least an identification of an associated user account having a social relationship established with the target user account.

The target live streaming room selecting module 402 is configured to select a target live streaming room based on interaction data of each associated user account indicated by the social information.

The recommendation information generating module 403 is configured to generate recommendation information of the target live streaming room based on information on the target live streaming room and the identification of the associated user account corresponding to the target live streaming room.

The recommendation information displaying module 404 is configured to display the recommendation information to the target user account.

Alternatively, in some embodiments, based on the above embodiment, the interaction data includes at least one of a type of each candidate live streaming room accessed by the associated user account within a predetermined time period, a duration during which the associated user account watches a live streaming in each candidate live streaming room, behavior data of the associated user account when watching the live streaming, and interactive information between the associated user account and a host account of each candidate live streaming room.

Figure 5:
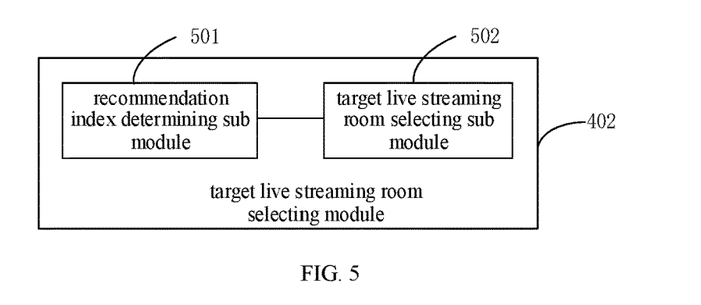
FIG. 5 is a block diagram illustrating a live streaming room selecting module according to an exemplary embodiment.

The target live streaming room selecting module 402 includes a recommendation index determining sub module 501 and a target live streaming room selecting sub module 502, as illustrated in FIG. 5.

The recommendation index determining sub module 501 is configured to determine a recommendation index of each candidate live streaming room based on the interaction data of all associated user accounts.

The target live streaming room selecting sub module 502 is configured select the candidate live streaming room satisfying a predetermined condition as the target live streaming room. The predetermined condition may include a first condition where a recommendation index of the candidate live streaming room is ranked within a predetermined ranking range, or the predetermined condition may include a second condition where a recommendation index of the candidate live streaming room is ranked within a predetermined ranking range and the candidate live streaming room is in an on-air state.

Figure 6:
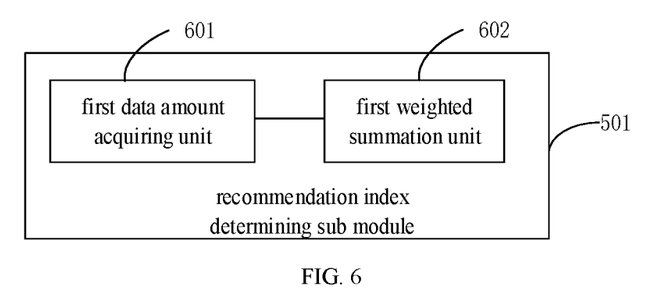
FIG. 6 is a block diagram illustrating a recommendation index determining module according to an exemplary embodiment.

Alternatively, in some embodiments, based on the above embodiment, the recommendation index determining sub module 501 includes a first data amount acquiring unit 601 and a first weighted summation unit 602, as illustrated in FIG. 6.

The first data amount acquiring unit 601 is configured to acquire a total amount of each kind of interaction data for each candidate live streaming room based on the interaction data of the associated user account corresponding to the candidate live streaming room.

The first weighted summation unit 602 is configured to acquire the recommendation index of the candidate live streaming room by performing weighted summation on the total amount of each kind of interaction data based on weighting factors.

Figure 7:
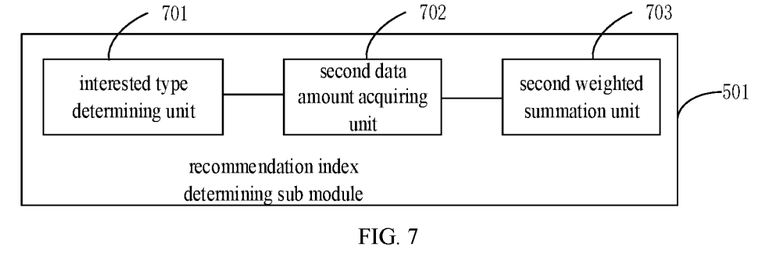
FIG. 7 is a block diagram illustrating a recommendation index determining module according to another exemplary embodiment.

Alternatively, in some embodiments, based on the above embodiment, the recommendation index determining sub module 501 includes an interested type determining unit 701, a second data amount acquiring unit 702 and a second weighted summation unit 703, as illustrated in FIG. 7.

The interested type determining unit 701 is configured to determine an interested type of interaction data of the target user account based on an interactive behavior feature of the target user account.

The second data amount acquiring unit 702 is configured to acquire a total amount of each kind of interaction data matching the interested type for each candidate live streaming room based on the interaction data of the associated user account in the candidate live streaming room.

The second weighted summation unit 703 is configured to acquire the recommendation index of the candidate live streaming room by performing weighted summation on the total amount of each kind of interaction data based on weighting factors.

Figure 8:
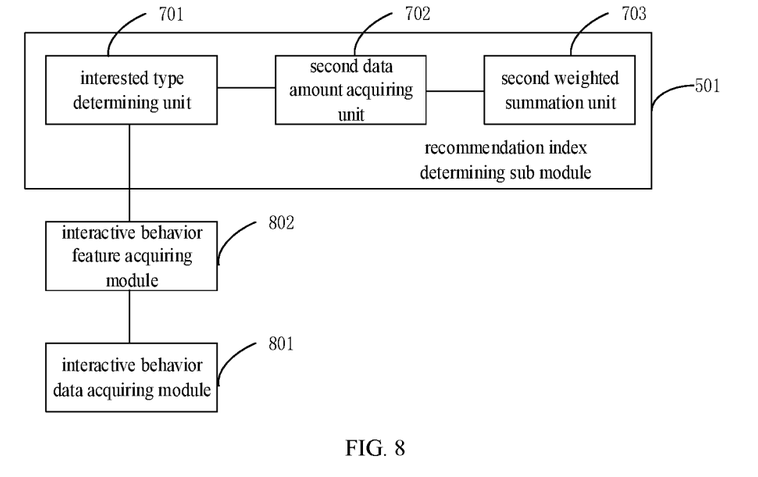
FIG. 8 is a block diagram illustrating an apparatus for recommending a live streaming room according to another exemplary embodiment.

Alternatively, in some embodiments, based on the above embodiment described with reference to FIG. 7, the apparatus further includes an interactive behavior data acquiring module 801 and an interactive behavior feature acquiring module 802, as illustrated in FIG. 8.

The interactive behavior data acquiring module 801 is configured to acquire interactive behavior data of the target user account in each live streaming room within a predetermined time period. The interactive behavior data comprises one or more of a type of the live streaming room, watching time in the live streaming room, behavior data in the live streaming room and interactive information between the target user account and a host account of the live streaming room.

The interactive behavior feature acquiring module 802 is configured to acquire the interactive behavior feature based on the interactive behavior data. The interactive behavior feature comprises a type of a preferred live streaming room, preferred watching time in the live streaming room, preferred behavior data in the live streaming room and preferred interactive information between the target user account and the host account of the live streaming room.

Alternatively, in some embodiments, based on the above embodiment, the recommendation information displaying module is configured to display recommendation information of the target live streaming room and an identification of the associated user account corresponding to the target live streaming room to the target user account or add a room identification of the target live streaming room along with the recommendation information to the recommendation list on a recommendation page, the recommendation page is configured to displaying a living streaming corresponding to each room identification included in the recommendation list.

Alternatively, in some embodiments, based on the above embodiment, the apparatus further includes one of a first triggering module, a second triggering module and a third triggering module.

The first trigger module is configured to trigger a server to acquire and return the social information by sending a request of the target user account to perform the predetermined operation.

The second trigger module is configured to trigger a server to select and return the target live streaming room based on the interaction data of each associated user account indicated by the social information by sending a request select the target live streaming room.

The third trigger module is configured to trigger a server to acquire and return the information on the target live streaming room by sending a request acquire the information on the target live streaming room.

Embodiments further provide an apparatus for recommending a live streaming room. The apparatus includes one of a social information acquiring module, a target live streaming room selecting module, a recommendation information generating module and a recommendation information displaying module.

The social information acquiring module is configured to acquire social information of a target user account in response to receiving a first request of the target user account to perform a predetermined operation, so as to display information on the target live streaming room. The social information comprises an identification of an associated user account having a social relationship with the target user account.

The target live streaming room selecting module is configured to select a target live streaming room based on interaction data of each associated user account indicated by the social information in each live streaming room in response to receiving a second request to select the target live streaming room, so as to display information on the target live streaming room.

The recommendation information generating module is configure to generate recommendation information of the target live streaming room based on information on the target live streaming room and the identification of the associated user account corresponding to the target live streaming room in response to receiving a third request to acquire the recommendation information of the target live streaming room.

The recommendation information displaying module is configured to display the recommendation information to the target user account.

Alternatively, in some embodiments, based on the above embodiment, the interaction data of an associated user account comprises one or more of a type of each candidate live streaming room accessed by the associated user account within a predetermined time period, watching time in each candidate live streaming room, behavior data in each candidate live streaming, and interactive information between the associated user account and a host account of each candidate live streaming room.

The target live streaming room selecting module includes a recommendation index determining sub module and a target live streaming room selecting sub module.

The recommendation index determining sub module is configured to determine a recommendation index of each candidate live streaming room based on the interaction data of all associated user accounts in response to receiving the second request.

The target live streaming room selecting sub module is configured select the candidate live streaming room satisfying a predetermined condition as the target live streaming room. The predetermined condition may include a first condition where a recommendation index of the candidate live streaming room is ranked within a predetermined ranking range, or the predetermined condition may include a second condition where a recommendation index of the candidate live streaming room is ranked within a predetermined ranking range and the candidate live streaming room is in an on-air state.

Alternatively, in some embodiments, based on the above embodiment, the recommendation index determining sub module includes a first data amount acquiring unit and a first weighted summation unit.

The first data amount acquiring unit is configured to acquire a total amount of each kind of interaction data for each candidate live streaming room based on the interaction data of the associated user account corresponding to the candidate live streaming room in response to receiving the second request.

The first weighted summation unit is configured to acquire the recommendation index of the candidate live streaming room by performing weighted summation on the total amount of each kind of interaction data based on weighting factors.

Alternatively, in some embodiments, based on the above embodiment, the recommendation index determining sub module includes an interested type determining unit, a second data amount acquiring unit and a second weighted summation unit.

The interested type determining unit is configured to determine an interested type of interested interaction data of the target user account based on an interactive behavior feature of the target user account in response to receiving the second request.

The second data amount acquiring unit is configured to acquire a total amount of each kind of interaction data matching the interested type for each candidate live streaming room based on the interaction data of the associated user account in the candidate live streaming room.

The second weighted summation unit is configured to acquire the recommendation index of the candidate live streaming room by performing weighted summation on the total amount of each kind of interaction data based on weighting factors.

Alternatively, in some embodiments, based on the above embodiment, the apparatus further includes an interactive behavior data acquiring module and an interactive behavior feature determining module.

The interactive behavior data acquiring module is configured to acquire interactive behavior data of the target user account in each live streaming room within a predetermined time period in response to receiving a fourth request to acquire the interactive behavior data. The interactive behavior data comprises one or more of a type of the live streaming room, watching time in the live streaming room, behavior data in the live streaming room and interactive information between the target user account and a host account of the live streaming room.

The interactive behavior feature determining module is configured to acquire the interactive behavior feature based on the interactive behavior data. The interactive behavior feature comprises a type of a preferred live streaming room, preferred watching time in the live streaming room, preferred behavior data in the live streaming room and preferred interactive information between the target user account and the host account of the live streaming room.

Alternatively, in some embodiments, based on the above embodiment, the recommendation information displaying module is configured to display the recommendation information of the target live streaming room and an identification of the associated user account corresponding to the target live streaming room to the target user account or add a room identification of the target live streaming room along with the recommendation information to the recommendation list on a recommendation page, the recommendation page is configured to displaying a living streaming corresponding to each room identification included in the recommendation list.

Embodiments of the disclosure further provide a terminal.

The terminal includes one or more processors, one or more memories for storing instructions executable by the one or more processors.

The one or more processors are configured to execute the instructions to implement the above method for recommending a live streaming room.

Embodiments of the disclosure further provide a server.

The server includes one or more processors, one or more memories for storing instructions executable by the one or more processors.

The one or more processors are configured to execute the instructions to implement the above method for recommending a live streaming room.

Embodiments of the disclosure further provide a system for recommending a live streaming room. The system includes the above terminal and the above server.

Embodiments of the disclosure further provide a storage medium including instructions that, when executed by one or more processors of a terminal, cause the terminal to perform the above method for recommending a live streaming room, or when executed by one or more processors of a server, cause the server to perform the above method for recommending a live streaming room.

With regard to the apparatus embodiments, the operations performed by each module have been described in the method embodiments in detail, and regarding the relevant content, reference can be made to the method embodiments, which are not described here.

In some embodiments, a computer program product is provided. When instructions in the computer program product are executed by one or more processors of a terminal or a server, the terminal or server is caused to perform the above method for recommending a live streaming room.

In some embodiments, a storage medium including instructions is provided, for example, a memory including instructions. The instructions can be executed by one or more processors of an electronic device to perform the above method. Alternatively, the storage medium may be a non-transitory computer-readable media such as read-only memory (ROM), random-access memory (RAM), CD-ROMs, magnetic tapes, floppy disks, and optical data storage devices.

Figure 9:
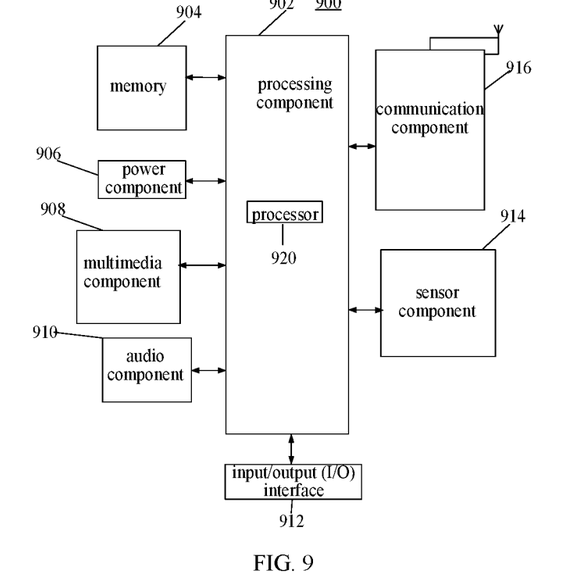
FIG. 9 is a block diagram illustrating an apparatus for recommending a live streaming room according to a yet exemplary embodiment.

FIG. 9 is a block diagram illustrating an apparatus 900 for recommending a live streaming room according to a still exemplary embodiment. For example, the apparatus 900 may be applied in a mobile terminal, such as a mobile phone, a computer, a digital broadcasting terminal, a message transceiver device, a game console, a tablet device, a medical device, a fitness device and a personal digital assistant.

With reference to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the apparatus 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone ("MIC") configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 904, executable by the processor 920 in the apparatus 900, for performing the above-described methods. For example, the non-transitory computer-readable storage medium may be a ROM, a RAM, a CD-ROM, a magnetic tape, a floppy disc, an optical data storage device, and the like.

In some embodiments, a computer program product is provided. When instructions in the computer program product are executed by a processor 920 of the apparatus 900, the apparatus 900 is caused to perform the above method for recommending a live streaming room.

Figure 10:
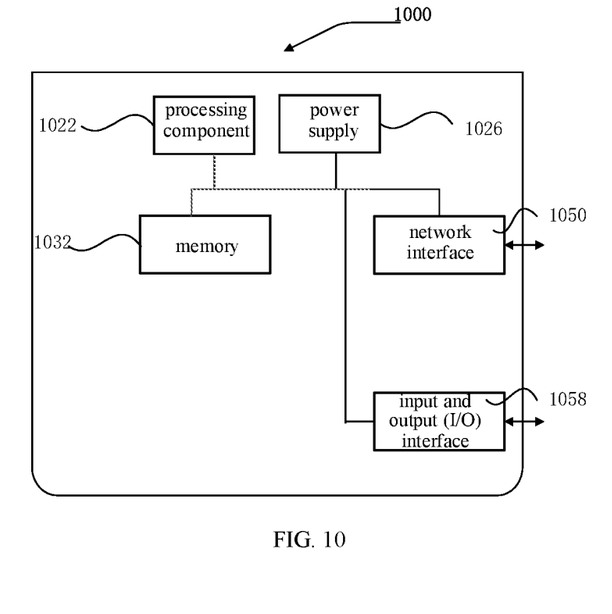
FIG. 10 is a block diagram illustrating an apparatus for recommending a live streaming room according to a still exemplary embodiment.

FIG. 10 is a block diagram of an apparatus 1000 for recommending a live streaming room according to an exemplary embodiment of the present disclosure. For example, the apparatus 1000 may be provided as a server. Referring to FIG. 10, the apparatus 1000 may include a processing component 1022 including one or more processors, and a memory resource represented by a memory 1032 for storing instructions (such as application programs) executable by the processing component 1022. The application programs stored in the memory 1032 may include one or more modules, and each module may correspond to a series of instructions. Furthermore, the processing component 1022 may be configured to execute the instructions so as to perform the above-mentioned method for recommending a live streaming room.

The apparatus 1000 may further include a power supply 1026 configured to perform a power management of the apparatus 1000, a wired or wireless network interface 1050 configured to connect the apparatus 1000 to the internet, and an input and output (I/O) interface 1058. The apparatus 1000 may operate an operating system stored in the memory 1032, such as Windows Server™, Mac OS X™, Unix™, Linux™, FreeBSD™ and so on.

Those skilled in the art may easily conceive of other embodiments of the disclosure by considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

What is claimed is:

1. A method for recommending a live streaming room, comprising: acquiring social information of a user account in response to an operation from the user account, wherein the social information comprises an identification of an associated user account having a social relationship with the user account; selecting a live streaming room based on interaction data of each associated user account indicated by the social information in each live streaming room; generating recommendation information of the live streaming room based on information of the live streaming room and the identification of the associated user account; and displaying the recommendation information to the user account;
   wherein the interaction data comprises one or more kinds of followings: a type of each candidate live streaming room, watching time in the candidate live streaming room, behavior data in the candidate live streaming room, and interactive information between the associated user account and a host account of the candidate live streaming room, wherein the candidate live streaming room is accessed by the associated user account within a first time period; said selecting a live streaming room comprising: determining a recommendation index of each candidate live streaming room based on the interaction data of each associated user account in each candidate live streaming room; and selecting a candidate live streaming room satisfying a condition as the live streaming room, wherein the condition comprises: a first condition where the recommendation index of the candidate live streaming room is ranked within a ranking range, or a second condition where the recommendation index of the candidate live streaming room is ranked within a ranking range and the candidate live streaming room is in an on-air state; and
   said determining a recommendation index of each candidate live streaming room comprising: determining an interested type of interaction data of the user account based on an interactive behavior feature of the user account; acquiring a total amount of each kind of interaction data matching the interested type based on the interaction data of the associated user account in a candidate live streaming room; and acquiring the recommendation index of the candidate live streaming room by performing weighted summation on the total amount of each kind of interaction data matching the interested type based on weighting factors.

2. The method of claim 1, said determining a recommendation index of each candidate live streaming room comprising: acquiring a total amount of each kind of interaction data based on the interaction data of the associated user account in a candidate live streaming room; and acquiring the recommendation index of the candidate live streaming room by performing weighted summation on the total amount of each kind of interaction data based on weighting factors.

3. The method of claim 1, further comprising: acquiring interactive behavior data of the user account in each live streaming room within a second time period, wherein the interactive behavior data comprises one or more kinds of followings: a type of the live streaming room, watching time in the live streaming room, behavior data in the live streaming room and interactive information between the user account and a host account of the live streaming room; and acquiring the interactive behavior feature based on the interactive behavior data, wherein the interactive behavior feature comprises a type of each preferred live streaming room, preferred watching time in the live streaming room, preferred behavior data in the live streaming room and preferred interactive information between the user account and the host account of the live streaming room.

4. The method of claim 1, said displaying the recommendation information to the user account comprising:
   displaying the recommendation information and a room identification of the live streaming room to the user account; or
   adding a room identification of the live streaming room along with the recommendation information to a recommendation list on a recommendation page, wherein the recommendation page is configured to display a living streaming corresponding to the room identification included in the recommendation list.

5. The method of claim 1, further comprising one or more of followings:
   receiving the social information of the user account obtained by a server in response to a request of the user account to perform the operation;
   receiving the live streaming room selected by the server based on the interaction data of each associated user account indicated by the social information in each live streaming room in response to a request to select the live streaming room; and
   receiving the recommendation information generated by the server based on information of the live streaming room and the identification of the associated user account in response to a request to obtain the recommendation information.

6. A terminal, comprising: a display screen; one or more processors, one or more memories, configured to store instructions executable by the one or more processors; wherein the one or more processors are configured to execute the instructions to implement the method for recommending a live streaming room comprising: acquiring social information of a user account in response to an operation from the user account, wherein the social information comprises an identification of an associated user account having a social relationship with the user account; selecting a live streaming room based on interaction data of each associated user account indicated by the social information in each live streaming room; generating recommendation information of the live streaming room based on information of the live streaming room and the identification of the associated user account; and displaying the recommendation information to the user account on the display screen;
   wherein the interaction data comprises one or more kinds of followings: a type of each candidate live streaming room, watching time in the candidate live streaming room, behavior data in the candidate live streaming room, and interactive information between the associated user account and a host account of the candidate live streaming room, wherein the candidate live streaming room is accessed by the associated user account within a first time period; said selecting a live streaming room comprising: determining a recommendation index of each candidate live streaming room based on the interaction data of each associated user account in each candidate live streaming room; and selecting a candidate live streaming room satisfying a condition as the live streaming room, wherein the condition comprises: a first condition where the recommendation index of the candidate live streaming room is ranked within a ranking range, or a second condition where the recommendation index of the candidate live streaming room is ranked within a ranking range and the candidate live streaming room is in an on-air state; and
   said determining a recommendation index of each candidate live streaming room comprising: determining an interested type of interaction data of the user account based on an interactive behavior feature of the user account; acquiring a total amount of each kind of interaction data matching the interested type based on the interaction data of the associated user account in a candidate live streaming room; and acquiring the recommendation index of the candidate live streaming room by performing weighted summation on the total amount of each kind of interaction data matching the interested type based on weighting factors.

7. The terminal of claim 6, said determining a recommendation index of each candidate live streaming room comprising: acquiring a total amount of each kind of interaction data based on the interaction data of the associated user account in a candidate live streaming room: and acquiring the recommendation index of the candidate live streaming room by performing weighted summation on the total amount of each kind of interaction data based on weighting factors.

8. The terminal of claim 6, wherein the one or more processors are further configured to: acquire interactive behavior data of the user account in each live streaming room within a second time period, wherein the interactive behavior data comprises one or more kinds of followings: a type of the live streaming room, watching time in the live streaming room, behavior data in the live streaming room and interactive information between the user account and a host account of the live streaming room; and acquire the interactive behavior feature based on the interactive behavior data, wherein the interactive behavior feature comprises a type of each preferred live streaming room, preferred watching time in the live streaming room, preferred behavior data in the live streaming room and preferred interactive information between the user account and the host account of the live streaming room.

9. The terminal of claim 6, said displaying the recommendation information to the user account comprising:

displaying the recommendation information and a room identification of the live streaming room to the user account; or adding a room identification of the live streaming room along with the recommendation information to a recommendation list on a recommendation page, wherein the recommendation page is configured to display a living streaming corresponding to the room identification included in the recommendation list.

10. The terminal of claim 6, wherein the one or more processors are further configured to execute one or more of followings:

receiving the social information of the user account obtained by a server in response to a request of the user account to perform the operation;

receiving the live streaming room selected by the server based on the interaction data of each associated user account indicated by the social information in each live streaming room in response to a request to select the live streaming room; and receiving the recommendation information generated by the server based on information of the live streaming room and the identification of the associated user account in response to a request to obtain the recommendation information.

11. A system, comprising: a terminal, comprising: a display screen, one or more processors and one or more memories, configured to store instructions executable by the one or more processors; wherein the one or more processors are configured to execute the instructions to implement followings: acquiring social information of a user account in response to an operation from the user account, wherein the social information comprises an identification of an associated user account having a social relationship with the user account; selecting a live streaming room based on interaction data of each associated user account indicated by the social information in each live streaming room; generating recommendation information of the live streaming room based on information of the live streaming room and the identification of the associated user account; and displaying the recommendation information to the user account on the display screen; and a server, comprising: one or more processors and one or more memories, configured to store instructions executable by the one or more processors; wherein the one or more processors are configured to execute the instructions to implement one or more of followings: acquiring social information of a user account in response to receiving a first request of the user account to perform an operation, so as to realize displaying of recommendation information of a live streaming room; wherein the social information comprises an identification of an associated user account having a social relationship with the user account; selecting the live streaming room based on interaction data of each associated user account indicated by the social information in each live streaming room in response to receiving a second request to select the live streaming room, so as to realize displaying of the recommendation information; and generating the recommendation information for displaying based on information of the live streaming room and the identification of the associated user account in response to receiving a third request to acquire the recommendation information;

wherein the interaction data comprises one or more kinds of followings: a type of each candidate live streaming room, watching time in the candidate live streaming room, behavior data in the candidate live streaming room, and interactive information between the associated user account and a host account of the candidate live streaming room, wherein the candidate live streaming room is accessed by the associated user account within a first time period; wherein the one or more processors of the server are configured to select the live streaming room by: determining a recommendation index of each candidate live streaming room based on the interaction data of each associated user account in each candidate live streaming room in response to receiving the second request; and selecting a candidate live streaming room satisfying a condition as the live streaming room, wherein the condition comprises: a first condition where the recommendation index of the candidate live streaming room is ranked within a ranking range, or a second condition where the recommendation index of the candidate live streaming room is ranked within a ranking range and the candidate live streaming room is in an on-air state; and said determining a recommendation index of each candidate live streaming room comprising: determining an interested type of interaction data of the user account based on an interactive behavior feature of the user account in response to receiving the second request; acquiring a total amount of each kind of interaction data matching the interested type based on the interaction data of the associated user account in a candidate live streaming room; and acquiring the recommendation index of the candidate live streaming room by performing weighted summation on the total amount of each kind of interaction data matching the interested type based on weighting factors.

12. The system of claim 11, said determining a recommendation index of each candidate live streaming room comprising: acquiring a total amount of each kind of interaction data based on the interaction data of the associated user account in a candidate live streaming room in response to receiving the second request; and acquiring the recommendation index of the candidate live streaming room by performing weighted summation on the total amount of each kind of interaction data based on weighting factors.

13. The system of claim 11, wherein the one or more processors of the server are further configured to: acquire interactive behavior data of the user account in each live streaming room within a second time period in responses to receiving a fourth request to acquire the interactive behavior data, wherein the interactive behavior data comprises one or more kinds of followings: a type of the live streaming room, watching time in the live streaming room, behavior data in the live streaming room and interactive information between the user account and a host account of the live streaming room; and acquire the interactive behavior feature based on the interactive behavior data, wherein the interactive behavior feature comprises a type of each preferred live streaming room, preferred watching time in the live streaming room, preferred behavior data in the live streaming room and preferred interactive information between the user account and the host account of the live streaming room.

14. The system of claim 11, wherein the one or more processors of the server are configured to generate the recommendation information for displaying by:
  displaying the recommendation information and a room identification of the live streaming room to the user account in response to receiving the third request; or
  adding a room identification of the live streaming room along with the recommendation information to a recommendation list on a recommendation page in response to receiving the third request, wherein the recommendation page is configured to display a living streaming corresponding to the room identification included in the recommendation list.

* * * * *